United States Patent [19]
Baumann

[11] 3,904,172
[45] Sept. 9, 1975

[54] BUTTERFLY VALVE WITH QUICK CHANGE TRIM INSERT

[76] Inventor: Hans D. Baumann, 29 Villa Dr., Foxboro, Mass. 02035

[22] Filed: July 24, 1974

[21] Appl. No.: 491,297

[52] U.S. Cl. ............ 251/305; 137/454.2; 251/152; 251/294
[51] Int. Cl.² ................ F16K 51/00; F16K 1/22
[58] Field of Search .......... 251/304, 305, 308, 231, 251/294, 298, 315, 306, 88, 307, 106–163, 309, 180, 310, 188, 311, 192, 312, 208, 313, 283, 314, 286, 316, 292, 317, 352, 366, 229, 152; 137/454.2, 454.6, 454.4, 454.5, 375

[56] References Cited
UNITED STATES PATENTS

| | | | |
|---|---|---|---|
| 1,818,050 | 8/1931 | Dow | 251/306 |
| 2,186,789 | 1/1940 | Rosenberg | 251/308 |
| 2,781,782 | 2/1957 | Gerwig | 251/294 |
| 2,811,981 | 11/1957 | Harris | 251/305 |
| 3,605,797 | 9/1971 | Dieckmann et al. | 137/375 |
| 3,623,696 | 11/1971 | Baumann | 251/298 |
| 3,636,972 | 1/1972 | Scaramucci | 251/315 |
| 3,640,499 | 2/1972 | Jung | 251/305 |
| 3,771,759 | 11/1973 | Pauquette | 251/305 |

Primary Examiner—William R. Cline
Assistant Examiner—H. Jay Spiegel

[57] ABSTRACT

A butterfly valve with tubular valve housing and sliding trim insert consisting of a ring type sleeve surrounding a vane which is supported by a shaft extending perpendicularly through and being supported by said sleeve, a pair of bearings being separated by a coiled compression spring and being located within said vane and on said shaft, and means tiltingly engaging said vane within the sleeve and tubular housing following the commands of a reciprocating actuator.

6 Claims, 3 Drawing Figures

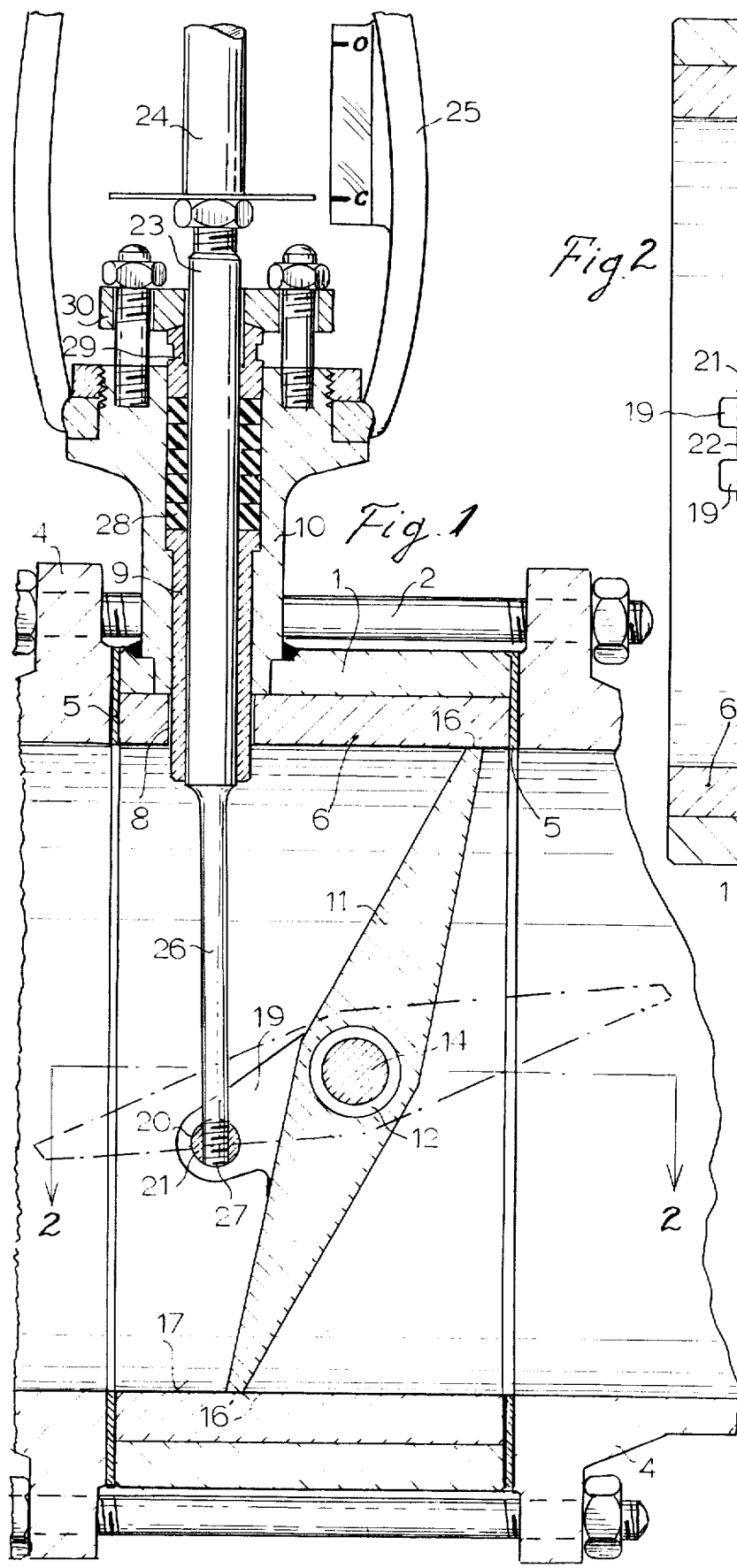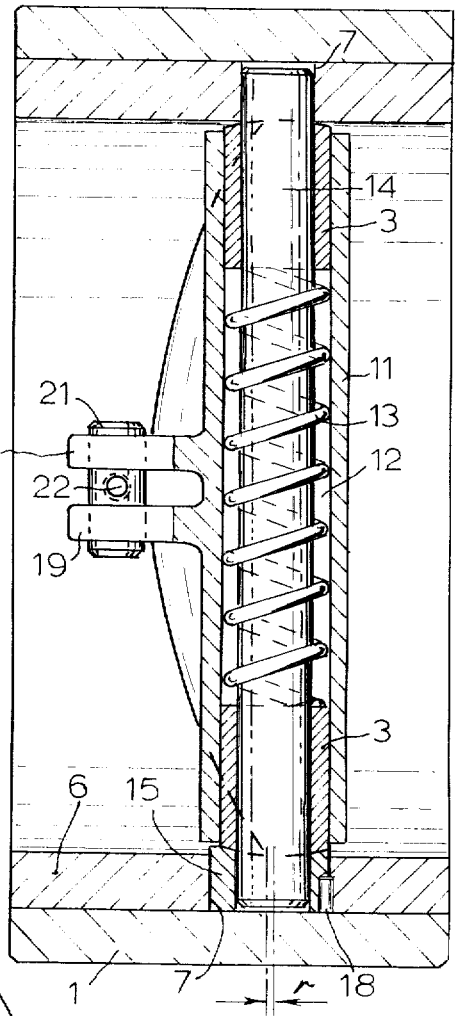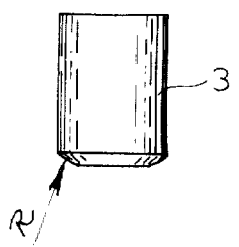

BUTTERFLY VALVE WITH QUICK CHANGE TRIM INSERT

BACKGROUND OF THE INVENTION

The field of the art of my invention relates to butterfly valves used for controlling fluid flow subject to manual or automatic regulation. Butterfly valve designs are numerous and covered by a multitude of prior patents. Nevertheless, what is here claimed as being new is a novel way to reduce the cost of construction of such a butterfly valve and to obtain a better shut-off or tightness in the closed position.

One major cost item was the necessity of present state of the art butterfly valves to utilize complex castings or heavy flame-cut segments for valve housings due to the need to provide external rotary bearing support for the vane shaft. Presently utilized rotary input torque through the vane shaft further necessitated key or pin connections between vane and shaft subjecting the mechanism to either undesired leakage (in case of pins) or backlash (for keys and slots). Finally, there is the problem of converting the reciprocating actuator movement into an angular shaft displacement, demanding expensive and cumbersome mechnical solutions.

My invention has none of these shortcomings in that it provides a truly tubular housing (with welded-on hub) which can be fabricated from pipe or tubing having no internal or external rotary bearings, a vane which does not have to be pinned or keyed to a shaft, shaft bearings which are located within the turning vane and which are pressed (to seal) against a tubular insert to prevent leakage between the intersection of the vane and the stationary insert (a common problem with present designs) and finally providing for flexible means to transmit reciprocating movement and force of conventional actuating devices (normally used on globe style valves) directly on to the rotating vane without the need of intermediary linkages.

Another feature of my invention is the provision of an adjustable eccentric bearing located on at least one of the terminating vane shaft ends, permitting the adjustment of the correct vane location in respect to the center of the tubular insert bore to aid in the perfect alignment of the vane periphery i.e. to provide for tight valve closure.

Yet, another main feature of my invention is the provision to allow easy access to the vane, shaft and bearings by permitting the sleeve insert (supporting all these parts) to slidingly disengage from the tubular valve housing.

These and other advantages of my invention will become apparent from a study of the following detailed description and drawings:

BRIEF DESCRIPTION OF DRAWINGS

FIG. 1 is a vertical sectional view of a preferred embodiment of my invention, showing the invention as part of a piping system.

FIG. 2 is a horizontal, sectional view taken along an axis indicated as 2 — 2 in FIG. 1.

FIG. 3 is a separated external view of one of the bearings shown otherwise in FIG. 2 as integral part of the invention.

DETAILED DESCRIPTION OF THE INVENTION

The invention butterfly valve with quick change trim insert consists in part of a tubular housing 1 fitting snugly inside a circular space formed by a number of tie rods 2, which clamp the housing between a pair of pipe line flanges 4 and gaskets 5 as part of a piping system. Housing 1, preferably made from steel pipe or tubing, contains within its circular bore a tubular insert 6, having a perpendicular bearing hole 7 extending through both walls along its horizontal axis, and a bore 8 extending in vertical direction and housing a slidingly inserted guide bushing 9 which is otherwise retained within a neck or extension 10 preferably welded to tubular housing 1.

Said tubular insert 6 contains within a vane 11, shown here of generally eliptical shape and engaging (in the "closed" valve position) the inside circumference of insert 6. A longitudinal bore 12 traversing said vane 11 and containing within two slidingly inserted bearings 3 separated from each other by a precompressed coiled spring 13. Both bearings 3 and spring 13 are surrounded and supported by a shaft 14, which otherwise engages snugly in bearing holes 7 of insert 6. The externally facing terminal ends of bearings 3 are machined with a radius R (see FIG. 3), which closely matches the inside radius of tubular insert 6 so that, when both bearings are pressed against the inside surface 17 of insert 6 by spring 13, radial surface R is touching and continuing the radial contact established between vane and insert (in the shown "closed" position) and thereby preventing leakage by the bearing-vane interface regardless of axial machining tolerances.

At least one of the horizontal bores 7 of insert 6 contains an eccentric sleeve 15 having its inside diameter containing shaft 14 on an axis, which is off-set from the axis of its external diameter by a given distance $r$. After vane 11, bearings 3, and shaft 14 are assembled within insert 6, sleeve 15 is rotated thereby shifting vane 11 up or down in respect to its vertical axis until both external radii 16 and 16' are in perfect contact with the insert wall 17 to provide tight shut-off. This preferred location of sleeve 15 is then secured by a pin 18 prior to insertion of the insert assembly within the bore of housing 1. Vane 11 has a pair of ribbed extensions 19 containing a perpendicular bore 20 in which a link 21 with a perpendicular threaded opening 22 is slidingly engaged.

Extension 10 contains a reciprocating valve stem 23 of which the upper terminating end connects with the moving portion 24 of a conventional actuating device 25 of prior and well-known art (not fully shown) and whose lower portion is suitably thinned in cross-section to provide a flexible portion 26 terminating in a threaded part 27 which, in turn engages with link 21. Valve stem 23 is furthermore guided by guide bushing 9 and sealed by suitable packing rings 28, compressed by a gland 29 and flange 30. Following the upward motion of the actuator stem 24, valve stem 23 pulls on link 21 and thereby tilts vane 11 into a near horizontal, i.e. "open," position (as indicated by dotted lines in FIG. 1). Conversely, any downward motion of stem 23 will close the valve.

It should be understood that vane 11 may assume any intermediate position dictated by the commands of the actuating device 25 and thereby precisely control an even so slight demand in flow variation without the detriments of backlash or loose play inherent in the actuating means of conventional butterfly valves. This is accomplished by having stem 23 purposely designed with a slender lower portion 26, in order to bend slightly to follow the change in effective lever length of ribs 19, while any angular mis-aligning is avoided through the rotation of link 21 following an angular excursion of vane 11.

While the invention has been described for a metallic tubular insert, the intended purpose can just as well be achieved with an insert which is elastomer lined or a vane which is coated with plastic material to provide bubble-tight shut-off without departing from the spirit of my invention and the scope of the attached claims.

I claim:

1. Butterfly valve with quick change trim insert comprising:
   a. a tubular housing having plane, terminating surfaces at opposite ends, defining one inlet and one outlet end respectively; said inlet and outlet ends adapted to be coupled to a pipe line;
   b. a longitudinal, straight, cylindrical passage formed in said housing and extending between said inlet and outlet ends;
   c. a tubular insert assembly removably placed within the straight, cylindrical passage, terminating essentially flush with said inlet and outlet ends of said housing;
   d. a bore breaching both walls and extending perpendicularly through the longitudinal axis and along the horizontal axis of said tubular insert;
   e. a shaft located within said bore and connecting both walls of said tubular insert;
   f. suitable bearing means located on said shaft to carry said shaft with respect to said housing;
   g. a valve disc tiltingly engaged on said shaft and within the central circular opening of said tubular insert;
   h. a valve stem extending through an opening of both, housing and tubular insert, and means for tiltingly engaging said valve disc following any reciprocating motion of said valve stem;
   i. suitable sealing means for said valve stem sealing said opening and means located externally of said valve housing to properly connect said valve stem to conventional actuating devices.

2. A valve of claim 1, wherein said tilting means engaging said valve disc consist of a link, rotatably retained by a pair of ribs extending in near perpendicular direction from one of the circularly projected surfaces of said valve disc, and wherein said link contains a threaded opening engaging with said valve stem.

3. A valve of claim 1, wherein said valve stem has a lower thinned portion whose terminating end threadingly engages said link and wherein said thinned portion can deform elastically to follow the angular excursions of said valve disc.

4. A valve of claim 1, wherein said bearings are slidingly engaged within the central perpendicular bore of said valve disc, and wherein said bearings are separated and pressed against the inner circular opening of the tubular insert by a coiled compression spring.

5. A valve of claim 4, wherein at least one of the terminating ends of said bearings are machined in a spherical fashion whose radius matches that of the circular opening of said tubular insert.

6. A valve of claim 1, wherein at least one of the walls breached by the perpendicular bore through said tubular insert contains an eccentric sleeve engaging said shaft and allowing adjustment in the position of said shaft axis in respect to that of the cylindrical bore of said tubular insert.

* * * * *